US012020165B2

(12) United States Patent
Ozcan et al.

(10) Patent No.: US 12,020,165 B2
(45) Date of Patent: Jun. 25, 2024

(54) SYSTEM AND METHOD FOR TRANSFORMING HOLOGRAPHIC MICROSCOPY IMAGES TO MICROSCOPY IMAGES OF VARIOUS MODALITIES

(71) Applicant: THE REGENTS OF THE UNIVERSITY OF CALIFORNIA, Oakland, CA (US)

(72) Inventors: Aydogan Ozcan, Los Angeles, CA (US); Yair Rivenson, Los Angeles, CA (US); Yichen Wu, Los Angeles, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 536 days.

(21) Appl. No.: 17/294,384

(22) PCT Filed: Nov. 14, 2019

(86) PCT No.: PCT/US2019/061494
§ 371 (c)(1),
(2) Date: May 14, 2021

(87) PCT Pub. No.: WO2020/102546
PCT Pub. Date: May 22, 2020

(65) Prior Publication Data
US 2022/0012850 A1 Jan. 13, 2022

Related U.S. Application Data

(60) Provisional application No. 62/768,040, filed on Nov. 15, 2018.

(51) Int. Cl.
G06N 3/084 (2023.01)
G02B 21/00 (2006.01)
(Continued)

(52) U.S. Cl.
CPC ......... *G06N 3/084* (2013.01); *G02B 21/0008* (2013.01); *G02B 21/365* (2013.01);
(Continued)

(58) Field of Classification Search
CPC .... G06N 3/084; G06N 3/045; G02B 21/0008; G02B 21/365; G02B 21/0016;
(Continued)

(56) References Cited

U.S. PATENT DOCUMENTS 9,581,961 B2 * 2/2017 Sato .................. G03H 1/0443
10,976,152 B2 * 4/2021 Cheng ................ G01B 9/0201
(Continued)

FOREIGN PATENT DOCUMENTS

AU 2004256280 * 1/2005 ........... A61B 5/1038
CN 104483291 * 6/2017
(Continued)

OTHER PUBLICATIONS

PCT International Preliminary Report on Patentability (Chapter I of the Patent Cooperation Treaty) for PCTUS2019/061494, Applicant: The Regents of the University of California, Form PCT/IB/326 and 373, dated May 27, 2021 (7 pages).
(Continued)

*Primary Examiner* — Jerome Grant, II
(74) *Attorney, Agent, or Firm* — VISTA IP LAW GROUP LLP

(57) ABSTRACT

A trained deep neural network transforms an image of a sample obtained with a holographic microscope to an image that substantially resembles a microscopy image obtained with a microscope having a different microscopy image modality. Examples of different imaging modalities include bright-field, fluorescence, and dark-field. For bright-field applications, deep learning brings bright-field microscopy contrast to holographic images of a sample, bridging the
(Continued)

volumetric imaging capability of holography with the speckle-free and artifact-free image contrast of bright-field microscopy. Holographic microscopy images obtained with a holographic microscope are input into a trained deep neural network to perform cross-modality image transformation from a digitally back-propagated hologram corresponding to a particular depth within a sample volume into an image that substantially resembles a microscopy image of the sample obtained at the same particular depth with a microscope having the different microscopy image modality.

30 Claims, 10 Drawing Sheets

(51) Int. Cl.
G02B 21/36 (2006.01)
G03H 1/00 (2006.01)
G03H 1/26 (2006.01)
G06T 5/70 (2024.01)
G06T 7/50 (2017.01)
G06V 10/764 (2022.01)
G06V 10/82 (2022.01)
G06V 20/69 (2022.01)

(52) U.S. Cl.
CPC ........... *G03H 1/0005* (2013.01); *G03H 1/268* (2013.01); *G06T 5/70* (2024.01); *G06T 7/50* (2017.01); *G06V 10/764* (2022.01); *G06V 10/82* (2022.01); *G06V 20/69* (2022.01); *G03H 2001/005* (2013.01); *G06T 2207/10056* (2013.01); *G06T 2207/10064* (2013.01); *G06T 2207/20081* (2013.01); *G06T 2207/20084* (2013.01)

(58) Field of Classification Search
CPC .................. G03H 1/0005; G03H 1/268; G03H 2001/005; G03H 2001/0883; G03H 1/0443; G03H 1/0866; G03H 2001/0447; G06T 5/002; G06T 7/50; G06T 2207/10056; G06T 2207/10064; G06T 2207/20081; G06T 2207/20084; G06V 10/764; G06V 10/82; G06V 20/69
USPC ........................................................ 382/128
See application file for complete search history.

(56) References Cited

U.S. PATENT DOCUMENTS

| | | |
|---|---|---|
| 2012/0148141 A1 | 6/2012 | Ozcan et al. |
| 2012/0218379 A1 | 8/2012 | Ozcan et al. |
| 2012/0248292 A1 | 10/2012 | Ozcan et al. |
| 2013/0203043 A1 | 8/2013 | Ozcan et al. |
| 2013/0280752 A1 | 10/2013 | Ozcan et al. |
| 2014/0160236 A1 | 6/2014 | Ozcan et al. |
| 2014/0300696 A1 | 10/2014 | Ozcan et al. |
| 2015/0111201 A1 | 4/2015 | Ozcan et al. |
| 2015/0153558 A1 | 6/2015 | Ozcan et al. |
| 2016/0070092 A1 | 3/2016 | Ozcan et al. |
| 2016/0334614 A1 | 11/2016 | Ozcan et al. |
| 2017/0153106 A1 | 6/2017 | Ozcan et al. |
| 2017/0160197 A1 | 6/2017 | Ozcan et al. |
| 2017/0168285 A1 | 6/2017 | Ozcan et al. |
| 2017/0220000 A1 | 8/2017 | Ozcan et al. |
| 2017/0357083 A1 | 12/2017 | Ozcan et al. |
| 2018/0052425 A1 | 2/2018 | Ozcan et al. |
| 2018/0292784 A1 | 10/2018 | Nguyen et al. |
| 2018/0373921 A1 | 12/2018 | Ozcan et al. |
| 2019/0137932 A1 | 5/2019 | Ozcan et al. |
| 2019/0286053 A1 | 9/2019 | Ozcan et al. |
| 2019/0294108 A1 | 9/2019 | Ozcan et al. |
| 2019/0333199 A1 | 10/2019 | Ozcan et al. |
| 2020/0103328 A1 | 4/2020 | Ozcan et al. |
| 2020/0250794 A1 | 8/2020 | Ozcan et al. |
| 2020/0310100 A1 | 10/2020 | Ozcan et al. |
| 2020/0340901 A1 | 10/2020 | Ozcan et al. |
| 2020/0393793 A1 | 12/2020 | Ozcan et al. |
| 2021/0043331 A1 | 2/2021 | Ozcan et al. |

FOREIGN PATENT DOCUMENTS

| | | | | |
|---|---|---|---|---|
| CN | 106875395 | * | 4/2020 | ... G06T 2207/10044 |
| WO | WO2011053074 | * | 5/2011 | ............... A61B 1/07 |
| WO | WO 2018/057972 A9 | | 5/2018 | |
| WO | WO 2019103909 | | 5/2019 | |
| WO | WO 2019/191697 | | 10/2019 | |
| WO | WO 2019236569 | | 12/2019 | |
| WO | WO 2020/018154 | | 1/2020 | |
| WO | WO 2020/082030 | | 4/2020 | |
| WO | WO 2020/139835 | | 7/2020 | |
| WO | WO 2020/219468 | | 10/2020 | |
| WO | WO 2021/003369 | | 1/2021 | |

OTHER PUBLICATIONS

Vittorio Bianco et al., Endowing a plain fluidic chip with micro-optics: a holographic microscope slide, Light: Science & Applications (2017) 6, e17055; doi:10.1038/lsa.2017.55.
Joe Chalfoun et al., MIST: Accurate and Scalable Microscopy Image Stitching Tool with Stage Modeling and Error Minimization, Scientific Reports | 7: 4988 | DOI:10.1038/s41598-017-04567-y.
Zoltán Göröcs et al., A deep learning-enabled portable imaging flow cytometer for cost-effective, highthroughput, and label-free analysis of natural water samples, Light: Science & Applications (2018) 7:66.
Alon Greenbaum et al., Imaging without lenses: achievements and remaining challenges of wide-field on-chip microscopy, Nat Methods. Sep. 2012 ; 9(9): 889-895. doi:10.1038/nmeth.2114.
Alon Greenbaum et al., Maskless imaging of dense samples using pixel super-resolution based multi-height lensfree onchip microscopy, Jan. 30, 2012 / vol. 20, No. 3 / Optics Express 3129.
P. Memmolo et al., Automatic focusing in digital holography and its application to stretched holograms, May 15, 2011 / vol. 36, No. 10 / Optics Letters 1945.
Onur Mudanyalia et al., Compact, Light-weight and Cost-effective Microscope based on Lensless Incoherent Holography for Telemedicine Applications, Lab Chip. Jun. 7, 2010; 10(11): 1417-1428. doi:10.1039/c000453g.
Yair Rivenson et al., Sparsity-based multi-height phase recovery in holographic microscopy, Scientific Reports | 6:37862 | DOI: 10.1038/srep37862.
Yair Rivenson et al., Phase recovery and holographic image reconstruction using deep learning in neural networks, Light: Science & Applications (2018) 7, 17141; doi:10.1038/lsa.2017.141.
Yair Rivenson et al., Deep Learning Microscopy, arXiv1705-04709v1 (May 2017).
Ayan Shinha et al., Lensless computational imaging through deep learning, vol. 4, No. 9, Sep. 2017, Optica, 1118.
Martin Abadi et al., TensorFlow: A System for Large-Scale Machine Learning, USENIX Association 12th USENIX Symposium on Operating Systems Design and Implementation (2016).
Yichen Wu et al., Lensless digital holographic microscopy and its applications in biomedicine and environmental monitoring, Methods 136 (2018) 4-16.
Yichen Wu et al., Extended depth-of-field in holographic imaging using deep-learning-based autofocusing and phase recovery, vol. 5, No. 6 / Jun. 2018 / Optica 704.
Yichen Wu et al., Label-free bio-aerosol sensing using mobile microscopy and deep learning, http://pubs.acs.org on Oct. 8, 2018.
Wenbo Xu et al., Digital in-line holography for biological applications, PNAS, Sep. 25, 2001, vol. 98, No. 20, 11301-11305.
Yibo Zhang et al., Edge sparsity criterion for robust holographic autofocusing, vol. 42, No. 19 / Oct. 1, 2017 / Optics Letters 3825.

(56) References Cited

OTHER PUBLICATIONS

PCT International Search Report and Written Opinion for PCT/US2019/061494 Applicant: The Regents of the University of California, dated Feb. 10, 2020 (8 pages).
Yichen Wu et al., Extended dept-of-field in holographic image reconstruction using deep learning based auto-focusing and phase-recovery, Optica, vol. 5, Issue 6 [online]. Mar. 21, 2018.
Yair Rivenson et al., Deep learning-based virtual histology staining using autofluorescence of label-free tissue, ArXiv180311293-Phys-2018.
Yair Rivenson et al., Deep Learning Enhanced Mobile-Phone Microscopy, ACS Photonics 2018, 5, 2354-2364.
Notification of the First Office Action dated Sep. 23, 2022 for Chinese Patent Application No. 2019800753469, (14 pages).
Yair Rivenson et al., Phase recovery and holographic image reconstruction using deep learning in neural networks, Light: Science & Applications (2018) 7, 17141; doi:10.1038/lsa.2017.141.
Supplementary European Search Report dated Dec. 13, 2021 for European Patent Application No. 19/885,132, Applicant: The Regents of the University of California, (6 pages).
Communication pursuant to Rules 70(2) and 70a(2) EPC dated Jan. 12, 2022 for European Patent Application No. 19885132.1, Applicant: The Regents of the University of California, (1 page).
Zoltan Gorocs et al., A deep learning-enable portable imaging flow cytometer for cost-effective, hight-throughput, and label-free analysis of natural water samples, Light: Science & Applications (2018) 7:66 (12 pages).
Yair Rivenson et al., Phase recovery and holographic image reconstructions using deep learning in neural networks, Light: Science & Applications (2018) 7, 17141 (9 pages).
Yichen Wu et al., Extended depth-of-field in holographic image reconstruction using deep learning based auto-focusing and phase-recovery, Arxiv. Org, Cornell University Library, 201 Olin Library Cornell University Ithaca, NY 14853, Mar. 21, 2018, XP081224518 (9 pages).
Response to extended European search report and communication pursuant to Rules 70(2) and 70a(2) EPC dated Jul. 22, 2022 for European Patent Application No. 19885132.1, Applicant: The Regents of the University of California, (58 page).
Communication under Rule 71(3) EPC dated Jan. 18, 2024 for European Patent Application No. 19885132.1, Applicant: The Regents of the University of California, (75 pages).

* cited by examiner

SYSTEM AND METHOD FOR TRANSFORMING HOLOGRAPHIC MICROSCOPY IMAGES TO MICROSCOPY IMAGES OF VARIOUS MODALITIES

RELATED APPLICATION

This Application is a U.S. National Stage filing under 35 U.S.C. § 371 of International Application No. PCT/US2019/061494, filed on Nov. 14, 2019, which claims priority to U.S. Provisional Patent Application No. 62/768,040 filed on Nov. 15, 2018, which is hereby incorporated by reference in its entirety. Priority is claimed pursuant to 35 U.S.C. § 119, § 371 and any other applicable statute.

STATEMENT REGARDING FEDERALLY SPONSORED RESEARCH AND DEVELOPMENT

This invention was made with government support under Grant Number 1533983, awarded by the National Science Foundation. The government has certain rights in the invention.

TECHNICAL FIELD

The technical field generally relates to methods and systems for transforming holographic images into images resembling those obtained using other microscopy imaging modalities including, for example, incoherent bright-field, fluorescence, and dark-field microscopy images.

BACKGROUND

Digital holographic microscopy enables the reconstruction of volumetric samples from a single hologram measurement, without any mechanical scanning. However, holographic images, for most practical applications, cannot match the speckle-free and artifact-free image contrast of an incoherent bright-field microscope. Some of these holographic artifacts include twin-image and self-interference noise, which are related to the missing phase information while additional artifacts appear due to the long coherence length/diameter of the illumination source, which creates speckle and background interference from out-of-focus or unwanted objects/surfaces within the optical beam path. Stated differently, because the point spread function of a coherent imaging system has non-diminishing ripples along both the lateral and the axial directions, out-of-focus objects will create interference fringes overlapping with the in-focus objects in the holographic reconstruction, which degrades the image contrast when reconstructing volumetric samples. These issues can be partially mitigated using different holographic reconstruction methods, sometimes also using additional measurements. However, additional methods and systems are needed to improve the image quality and usefulness of images obtained with holographic microscopes without the need for additional measurements and complicated reconstruction algorithms.

SUMMARY

In one embodiment, a system and method is described that uses a trained deep neural network executed by software using a computing device to perform cross-modality image transformation from a digitally back-propagated hologram (or a raw hologram) corresponding to a given depth within a sample volume into an image that is substantially resembles a different microscopy image modality acquired at the same depth. In one embodiment, the different microscopy image modality is one of bright-field, fluorescence, and dark-field microscopy images. Because a single hologram is used to digitally propagate to different sections or planes (e.g., heights) within the sample volume to virtually generate images that substantially resemble images of a different microscopy image modality of each section, this approach bridges the volumetric imaging capability of digital holography with speckle-free and artifact-free image contrast of bright-field microscopy (or fluorescence microscopy or dark-field microscopy in other embodiments). After its training, the deep neural network learns the statistical image transformation between a holographic imaging system and the desired different microscopy image modality (e.g., an incoherent bright-field microscope in one particular embodiment). In this regard, deep learning brings together the best of both worlds by fusing the advantages of holographic and incoherent bright-field imaging modalities.

Holographic microscopy images obtained with a holographic or interferometric microscope are input into a trained deep neural network to perform cross-modality image transformation from a digitally back-propagated hologram corresponding to a particular depth within a sample volume into an image that substantially resembles an image obtained with a different microscopy image modality obtained at the same depth. In one preferred aspect of the invention, the different microscopy image modality is a bright-field microscope image. This deep learning-enabled image transformation between holography and bright-field microscopy replaces the need to mechanically scan a volumetric sample. In addition, a single monochrome image obtained with the holographic microscope may be transformed using the trained deep neural network into a colored image having substantially the same color distribution as an equivalent bright-field image.

In one embodiment, a method of transforming an image of a sample obtained with a holographic microscope to an image that substantially resembles an image obtained with a different microscopy image modality includes obtaining a single holographic image of the sample with a holographic microscope. The holographic image of the sample is then digitally back-propagated to a particular depth with image processing software. The back-propagated holographic image is then input into a trained deep neural network embodied in software that is executed on a computing device using one or more processors. The trained deep neural network outputs an image of the sample at the particular depth, wherein the output image substantially resembles, in one embodiment, a bright-field microscopy image of the sample obtained at the same particular depth. In another embodiment, the trained deep neural network outputs an image of the sample at the particular depth, wherein the output image substantially resembles a fluorescence microscopy image of the sample obtained at the same particular depth. In another embodiment, the trained deep neural network outputs an image of the sample at the particular depth, wherein the output image substantially resembles a dark-field microscopy image of the sample obtained at the same particular depth.

In another embodiment, a method of transforming an image of a sample obtained with a holographic microscope to an image that substantially resembles a microscopy image obtained with a microscope having a different microscopy image modality includes the operations of obtaining a single holographic image of the sample with the holographic microscope. The holographic image of the sample (which is no back-propagated) is input to a trained deep neural network that is executed by a computing device. The trained deep neural network outputs an image of the sample at a particular depth from the trained deep neural network, wherein the output image substantially resembles a microscopy image of the sample obtained at the same particular depth with a microscope having the different microscopy image modality.

In another embodiment, a microscopy system includes a holographic microscope (or other imaging modality that uses a coherent light source that results in interferometric artifacts) and a computing device having software configured a execute a trained deep neural network, the trained deep neural network receiving as an input a raw and/or back-propagated hologram image of a sample obtained with the holographic microscope (or other imaging modality) and outputting one or more output images of the sample at any arbitrary depth within the sample, wherein the one or more output images substantially resemble a bright-field microscope image of the sample obtained/acquired at the same arbitrary depth within the sample.

DETAILED DESCRIPTION OF THE ILLUSTRATED EMBODIMENTS

Figure 1A:
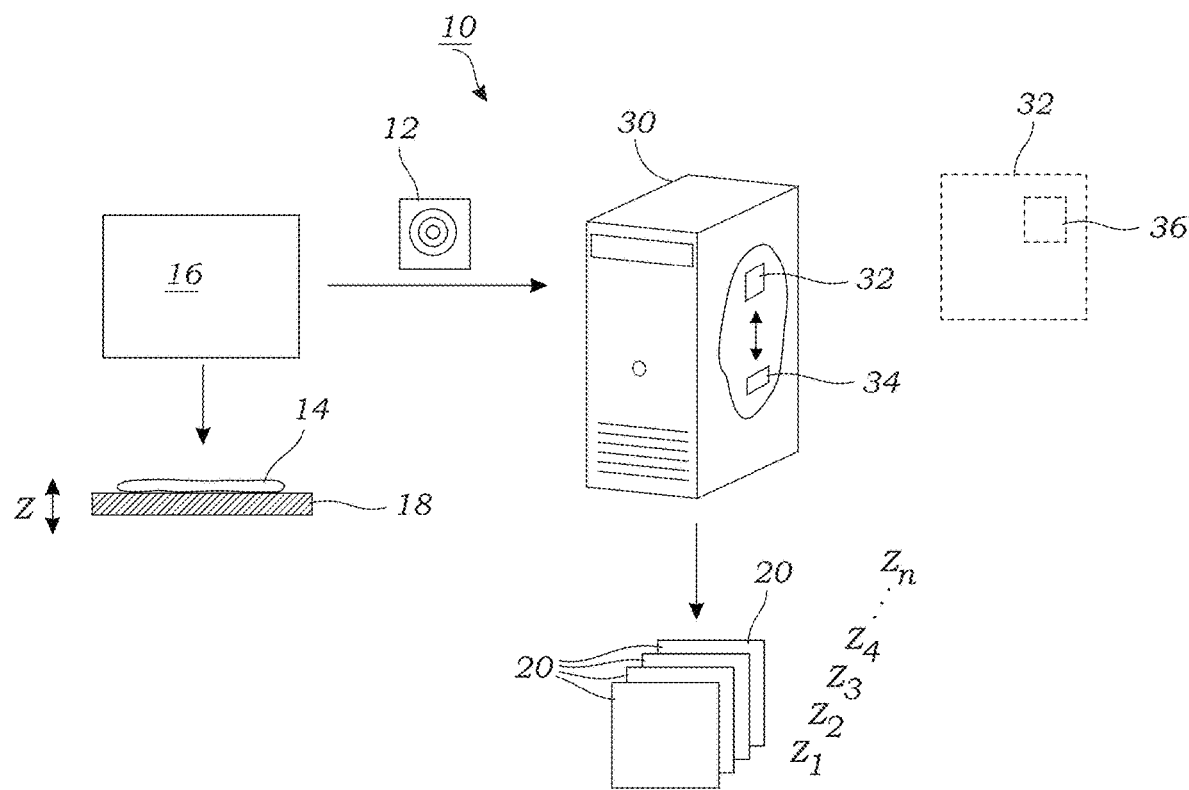
FIG. 1A schematically illustrates a system that is used to transform an image of a sample obtained with a holographic or interferometric microscope to an output image at one or more depths (in the z direction as explained herein) that substantially resembles a microscopy image obtained with a microscope having a different microscopy image modality according to one embodiment.

FIG. 1A schematically illustrates one embodiment of a system 10 that is used to transform an image 12 of a sample 14 obtained with a holographic or interferometric microscope 16 to an output image 20 at one or more depths (in the z direction as explained herein) that substantially resembles a microscopy image obtained with a microscope having a different microscopy image modality. For example, the system 10 may be used to transform an image 12 of a sample 14 obtained with a holographic microscope 16 to an output image 20 (at the one or more depths) that substantially resembles a bright-field image of the sample 14 at the same one or more depths. In yet another example, the system 10 may be used to transform an image 12 of a sample 14 obtained with a holographic microscope 16 to an output image 20 (at the one or more depths) that substantially resembles a fluorescence image of the sample 14 at the same one or more depths. In still another example, the system 10 may be used to transform an image 12 of a sample 14 obtained with a holographic microscope 16 to an output image 20 (at the one or more depths) that substantially resembles a dark-field image of the sample 14 at the same one or more depths. As explained herein, the system 10 may generate an output image 20 at a single depth in which case the system 10 outputs a two-dimensional (2D) image. The system 10 may also generate multiple output images 20 at multiple depths in which case the system outputs a three-dimensional (3D) image stack.

Figure 1B:
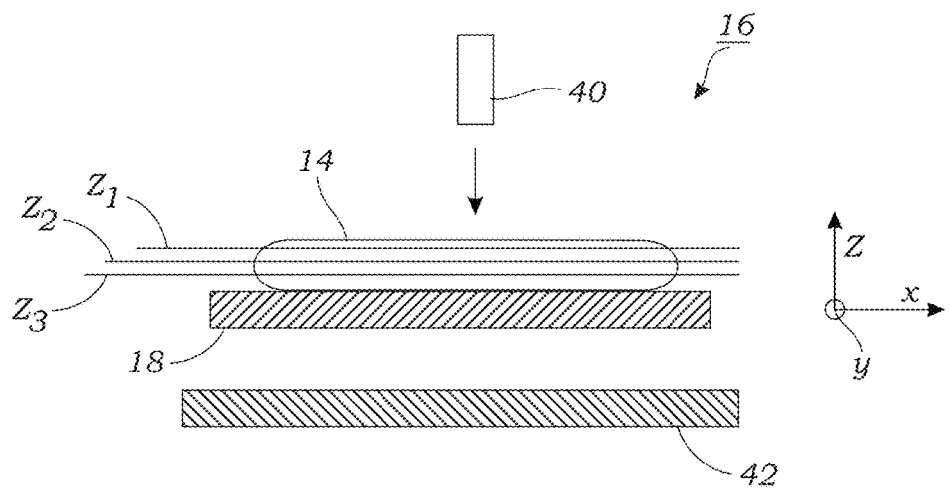
FIG. 1B schematically illustrates one embodiment of a holographic microscope (e.g., lens-free in this embodiment) that is used to obtain a holographic image of a sample.

As seen in FIG. 1A, the holographic microscope 16 obtains a holographic image 12 (or multiple such images or holograms 12) of a sample 14. The sample 14 may be disposed on a sample holder 18 such as illustrated in FIGS. 1A and 1B although in other embodiments the sample holder 18 may be omitted. The sample holder 18 may include an optically transparent substrate or the like. The sample 14 may include a biological sample such as tissue, cells, bodily fluids, environmental fluids, or the like. The sample 14 may also include a three-dimensional sample volume (e.g., solid or fluid volume). In examples described herein the sample 14 may include particulate matter such as pollen or pollution. The sample 14 may include organic or inorganic samples as well. The sample 14 may include an environmental sample (e.g., water or fluid containing organisms or particular matter). The sample 14 may include cells contained in carrier medium or fluid. The sample may be stationary or it may be moving (e.g., fluid flowing in a microchannel, flowcell, or the like).

As seen in FIG. 1A, the system 10 includes a computing device 30 that has image processing software 32 executed thereon using one or more processors 34. The image processing software 32 includes as part thereof, a trained neural network 36 as described herein. The computing device 30 may include, by way of example, a personal computer, laptop, tablet PC, portable electronic device, server, or virtual server. The computing device 30 may be located locally with or near the holographic microscope 16. Communication between the holographic microscope 16 and the computing device 30 may occur over conventional wired or wireless connections (e.g., Bluetooth®, Wi-Fi, etc.). The computing device 30 may also be located remotely from the holographic microscope 16. For example, the computing device 30 may be a server or other cloud-type computer that receives the holographic image 12 that is transferred over a computer network (e.g., a wide area network such as the Internet). The image processing software 32 may be implemented in any number of programs. Examples, include programs or programming languages such as C++, Python, Tensorflow, MATLAB, and the like. In some embodiments, the one or more processors 34 may include one or more graphics processing units (GPUs) which can speed the training of the deep neural network 36 and the output of the system 10 but is not necessary. Various aspects of the image processing software 32 such as back-propagation and execution of the trained neural network 36 may run by the same software programs or modules or they may operate as separate programs or modules that work in concert together. In addition, the computing device 30 may employ multiple computing devices 30 or computing modules to perform various functions. For example, one computing device 30 or module may be used to perform the digital back-propagation while another computing device 30 or module is used to run the trained neural network 36. Of course, these may also be executed by a single computing device 30 or module.

FIG. 1B illustrates one particular example of a holographic microscope 16. The holographic microscope 16 in this embodiment is a lens-free but it should be appreciated that holographic image(s) 12 may be obtained with other conventional lens-based holographic microscopes 16. The holographic microscope 16 may, in some embodiments, include a portable or mobile holographic microscope 16 that uses a portable electronic device such as a Smartphone along with an opto-mechanical attachment containing the light source(s), external lens, sample holder to acquire holographic images 12 of the sample 14. In some embodiments, the holographic microscope 16 may image a moving sample 14 such as fluid or objects contained in a flowing fluid. For example, the holographic microscope 14 may include a flow-cytometry holographic microscope or a microfluidic-based holographic microscope. The holographic microscope 14 may also be used to image particles or objects that impact on a substrate. For example, particles or objects entrained in gas flow may impact and be retained on a substrate which is then imaged. These objects may be imaged using an impactor-based holographic microscope. The system 10 may also include, in other embodiments, another imaging modality that uses coherent light that results in speckle or interference with out-of-focus or unwanted objects in the optical beam path instead of a holographic microscope 16.

In the embodiment of FIG. 1B, a light source 40 emits coherent or partially coherent illumination. This may include, a laser diode, light emitting diode, VCSEL diode or the like. The light source 40 illuminates the sample 14 from a distance of several centimeters. The sample 14 is disposed on a sample holder 18 as illustrated in FIG. 1B. An image sensor 42 is disposed on an opposing side of the sample 14 and sample holder 18 and captures holograms (holographic images) of the sample 14. The image sensor 42 may include, for example, a complementary metal oxide semiconductor (CMOS) image sensor or the like. The images sensor 42 may obtain monochrome or color images of the sample 14. The image sensor 42 is typically placed very close or adjacent to the sample holder 18 (e.g., within a few μm to a few mm). FIG. 1B illustrates various depths or z distances (e.g., $z_1$, $z_2$, $z_3$) that are located within the three-dimensional volume of the sample 14. As described herein, the system 10 and method can be used to generate an output image 20 at any arbitrary depth (z) within the sample 14 from a single holographic image 12 or shot that is a different imaging modality from the obtained holographic image 12. This may include one or more output images 20 are, for example, bright-field, dark-field, and fluorescence images.

Figure 2:
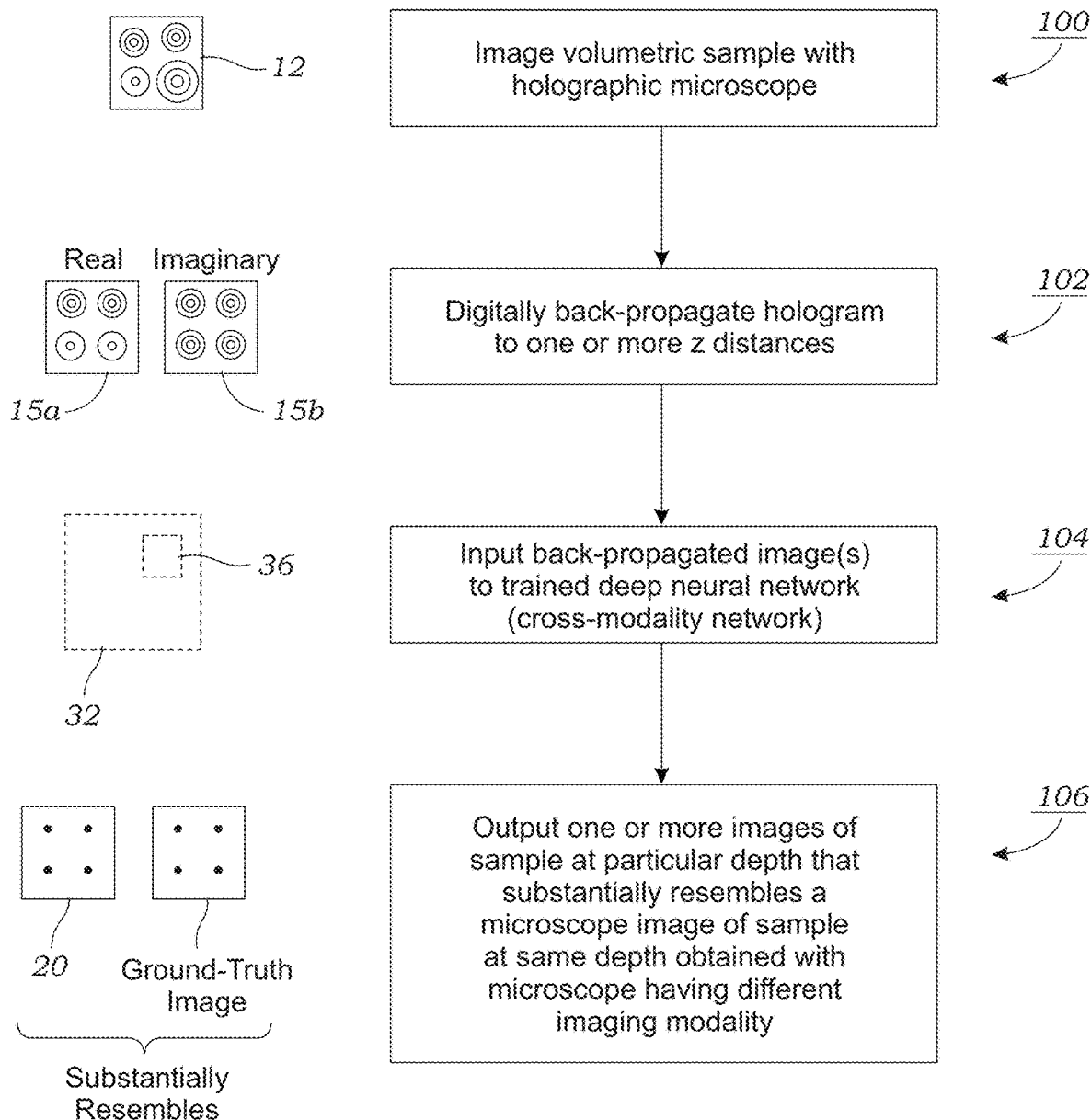
FIG. 2 illustrates a flow chart illustrating the operations of the method of transforming an image of a sample obtained with a holographic microscope to an image that substantially resembles a microscopy image obtained with a microscope having a different microscopy image modality.

FIG. 2 illustrates an illustrative workflow of steps or operations that are used in operation of the system 10. First, in operation 100, the sample 14 is imaged with the holographic microscope 16 to generate the holographic image 12. Next, as seen in operation 102, the holographic image 12 is then digitally back-propagated to one or more z distances within the volumetric space of the sample 14 using the image processing software 32. For example, in the context of FIG. 1B, this may be $z_1$, $z_2$, and $z_3$. Digital back-propagation of the holographic image 12 may be accomplished using any known digital back-propagation techniques including, for example, the angular spectrum-based back-propagation. The angular spectrum method is a technique for modeling the propagation of a wave field and involves expanding a complex wave field into a summation of an infinite number of plane waves. The hologram is first transformed to the spatial frequency domain using a fast Fourier transform (FFT). Then a phase factor, which is a function of the wavelength, propagation distance, and refractive index of the medium, is multiplied with the angular spectrum. Finally, it is inverse-Fourier-transformed to the spatial domain to obtain the back-propagated image of the sample.

In another embodiment, the operation 102 where the holographic image 12 is digitally back-propagated may be omitted or bypassed and the holographic image 12 is input directly to the trained deep neural network 36 as seen in operation 104. Thus, in the context of the operations listed in FIG. 2, operation 102 may be optional in some embodiments and the raw holographic image 12 or hologram is input directly into the trained deep neural network 36.

The digital back-propagation generates, for a particular z distance, a real back-propagated image 15a and an imaginary back-propagated image 15b as seen in FIG. 2. Next, as seen in operation 104, the back-propagated images 15a, 15b are then input to the trained deep neural network 36 of the image processing software 32. Next, as seen in operation 106 of FIG. 2, The trained deep neural network 36 then outputs or generates an output image 20 at the particular z distance that substantially resembles or is substantially equivalent to a microscopy image of the sample 14 obtained at the same particular depth z with a microscope having the different microscopy image modality. For example, the output image 20 may substantially resemble or be substantially equivalent to an image obtained at the same z distance from a bright-field microscope (bright-field image), a dark-field microscope (dark-field image), or a fluorescence microscope (fluorescence image). In another embodiment, it may be possible for the output image 20 to have a lateral and/or axial resolution that exceeds the lateral and/or axial resolution of the raw, back-propagated, and/or ground-truth images obtained with the microscope having the different image modality.

The output image 20 is substantially free of speckle and other interferometric artifacts. A significant advantage of is that a single holographic image 12 obtained of the sample 14 can be used to generate enhanced output images 20 (e.g., resembling bright-field microscope images, dark-field microscope images, or fluorescence images) at any depth (z) within the sample 14. That is to say a single holographic image 12 can be used to obtain multiple different pseudo-images 20 of the sample 14 that resemble an entirely different imaging modality at any number of depths (z) within the sample 14. Moreover, while the holographic image 12 of the sample 14 is obtained using, in one embodiment, a monocolor image sensor 42, in some embodiments, the output image(s) 20 that are generated by the trained deep neural network 36 are color images. That is to say, a holographic image 12 obtained using a monocolor image sensor 42 can, using the appropriately trained neural network 36 can generate output images 20 that are in color (e.g., color bright-field images).

In a conventional imaging process, an expensive optical microscope is used to make a number of time-consuming scans at different heights which requires mechanical scans to be performed for each image slice. For example, using a conventional optical microscope it may take about 1 min to generate a N=81 slices stack in a single FOV. In comparison, a digital holographic lens-less microscope 16 is inexpensive and requires only a single (N=1) holographic image 12 to be captured, which is then back-propagated to any z-distance, and a reconstructed output image 20 is generated with comparable quality, with the help of the trained neural network 36.

The system 10 uses a trained deep neural network 36 to perform cross-modality image transformation from a digitally back-propagated hologram (15a, 15b) corresponding to a given depth (z) within the volume of the sample 14 into an output image 20 that substantially resembles or is substantially equivalent to a microscopy image acquired at the same depth using a different imaging modality. Because a single holographic image 12 is used to digitally propagate image information to different sections of the sample 14 to virtually generate, in one embodiment, a pseudo-bright-field image 20 of each section, this approach combines the snapshot volumetric imaging capability of digital holography with the speckle- and artifact-free image contrast and axial sectioning performance of bright-field microscopy. Following its training, the deep neural network 36 has learned the statistical image transformation between a holographic microscope 16 and the different imaging modality (e.g., bright-field microscopy). In some sense, deep learning brings together the best of both worlds by fusing the advantages of both the holographic and incoherent bright-field imaging modalities.

Experimental

Figure 3:
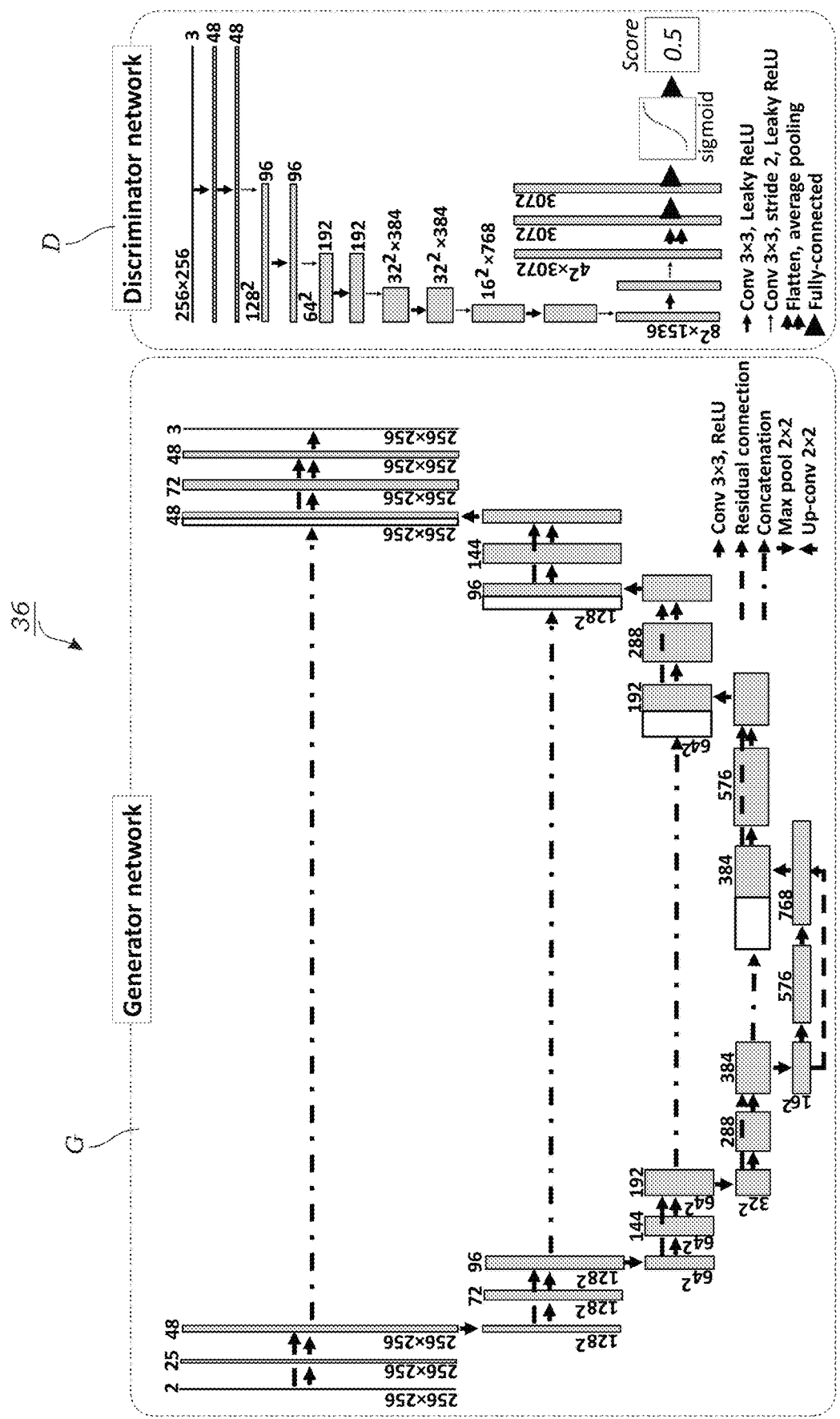
FIG. 3 illustrates the structure of the neural network structure according to one embodiment. The numbers represent the size and the channels of each block. ReLU: rectified linear unit. Conv: convolutional layer.
Figure 4:
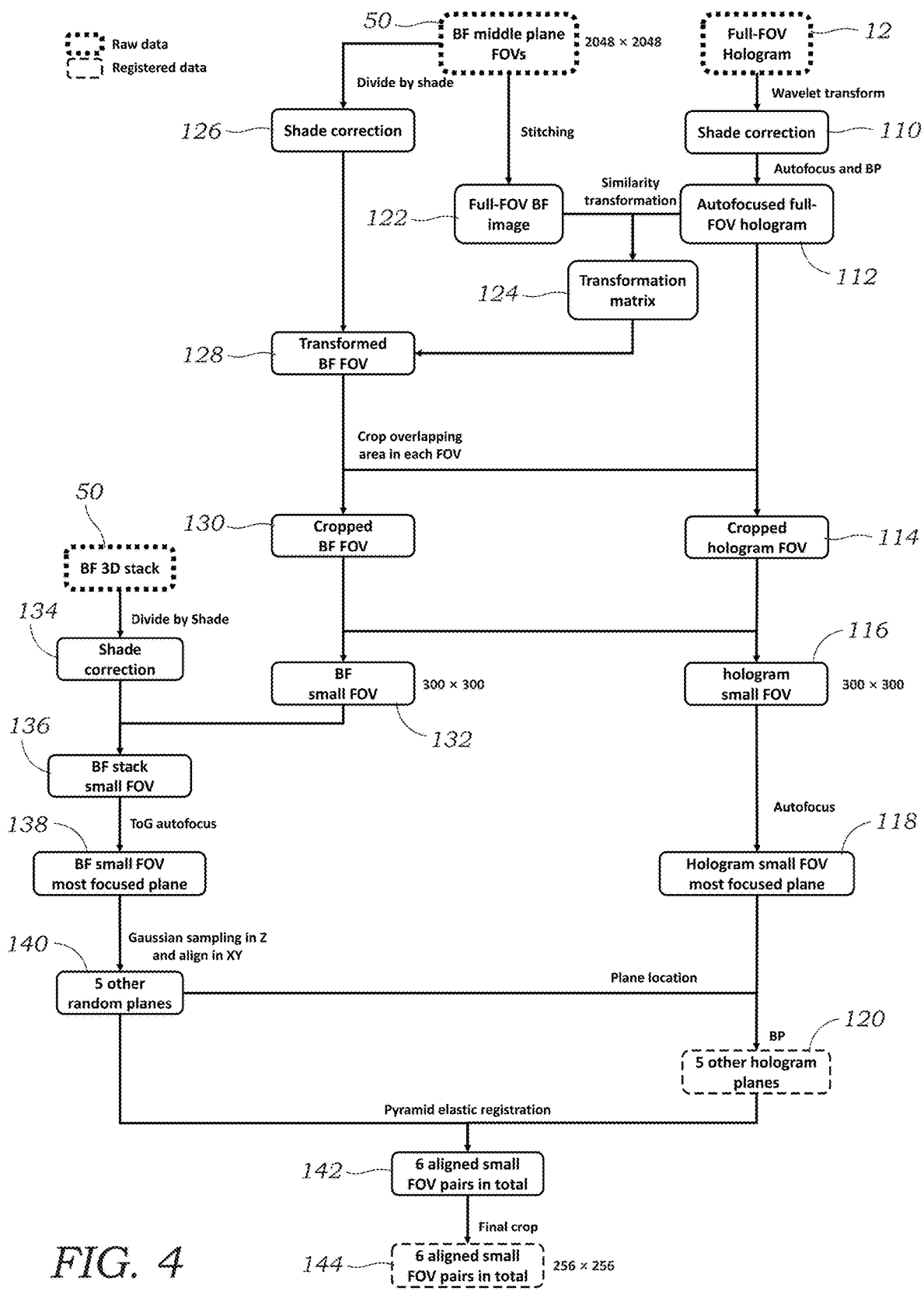
FIG. 4 illustrates a flowchart of image registration and data pre-processing used for training the neural network according to one embodiment. This process is used to register pairs of bright-field images at different planes with back-propagated holograms obtained with a holographic microscope that is used to train the deep neural network.

Experiments were conducted to transform holographic images 12 obtained with a holographic microscope 16 to pseudo bright-field images 20. For the holographic to bright-field image transformation, the trained deep neural network 36 used a generative adversarial network (GAN). FIG. 3 illustrates the network structure of the GAN 36. The training dataset for the deep neural network 36 was made up of images from pollen samples 14 captured on a flat substrate using a sticky coverslip. The coverslip was scanned in 3D using a bright-field microscope (Olympus IX83, 20×/0.75 NA objective lens), and a stack of 121 images with an axial spacing of 0.5 μm was captured for each region of interest to constitute the ground-truth labels. Next, using a lens-less holographic microscope 16, in-line holographic images 12 were acquired corresponding to the same fields-of-view (FOVs) scanned with the bright-field microscope. By progressively applying a series of image registration steps from the global coordinates to the local coordinates of each image patch (e.g., a global and local registration process as seen in FIG. 4), the back-propagated holographic images 15a, 15b at different depths were precisely matched to the bright-field microscopy ground-truth image stack in both the lateral and axial directions. FIG. 4 illustrates the image registration and data pre-processing used to align the ground-truth images with the holographic images 12 at the different depths/planes. These registered pairs of back-propagated hologram images 15a, 15b and corresponding bright-field microscopy images were then cropped into 6,000 patches of 256×256 pixels for training of the deep neural network 36.

FIG. 4 illustrates a process whereby a large or full-FOV holographic image 12 of a sample 14 is subject to a shade correction operation 110 followed by an autofocus operation 112. Shade correction removes dirt and unwanted patterns in the image. A cropped hologram FOV is created in operation 114. From this cropped hologram FOV a hologram having a smaller FOV (300×300 pixels) is generated as seen in operation 116. An autofocus operation is performed in operation 118 to generate a hologram with the small FOV at the most focused plane. Besides the most focused plane, a plurality (five in this case) of additional holograms or holographic images at different z distances or planes that correspond to the selected z distances of the ground-truth (operation 140 of FIG. 4) images are generated (hologram z-stack) as seen in operation 120 using digital back-propagation 102 as described herein (FIG. 2). For training, ground-truth (e.g., bright-field) images 50 at different z distances or planes are obtained of the sample 14. The middle plane FOV image 50 is then stitched together as seen in operation 122 to generate a full FOV bright-field image. Next, in operation 124, a transformation matrix is generated that rescales the image to correct for tilt, rotation, or shifting of the image. In operation 126, the middle plane FOV image 50 is subject to shade correction. The transformation matrix that was generated in operation 124 is used to generate a transformed bright-field FOV image as seen in operation 128. An overlapping area in the transformed bright-field FOV image 50 and the autofocused full FOV hologram of operation 112 is then cropped as seen in operation 130. From this cropped BF FOV an image having a smaller FOV (300×300 pixels) is generated as seen in operation 132.

Still referring to FIG. 4, the other bright-field images 50 of the image stack are then subject to a shade correction operation as seen in operation 134. These bright-field (BF) images are then cropped to create a BF stack of small FOV images as seen in operation 136. An autofocusing operation is performed as seen in operation 138 to find the BF small FOV most focused plane. Next, in operation 140 a BF stack of images in other random planes (5 in this embodiment) are selected using Gaussian sampling in the z direction and aligned in the x and y direction. A pyramid elastic registration process as seen in operation 142 is performed to generate six (6) total small FOV image pairs. Each registered image pair includes the ground-truth BF image along with the corresponding digitally back-propagated image. In a final operation, the registered image pairs are cropped as seen in operation 144 to create six (6) smaller FOV image pairs (256×256). These registered image pairs are then used to train the deep neural network 36.

While FIG. 4 illustrates various aspects used to globally and locally register image pairs of microscope-obtained bright-field images and corresponding back-propagated hologram images at the same depth if the sample images are particularly clean or free from dirt, dust, other artifacts, or lack tilting, rotation, or the like one or more of these operations may be omitted (e.g., shade correction, application of the transformation matrix, etc.).

Figure 5:
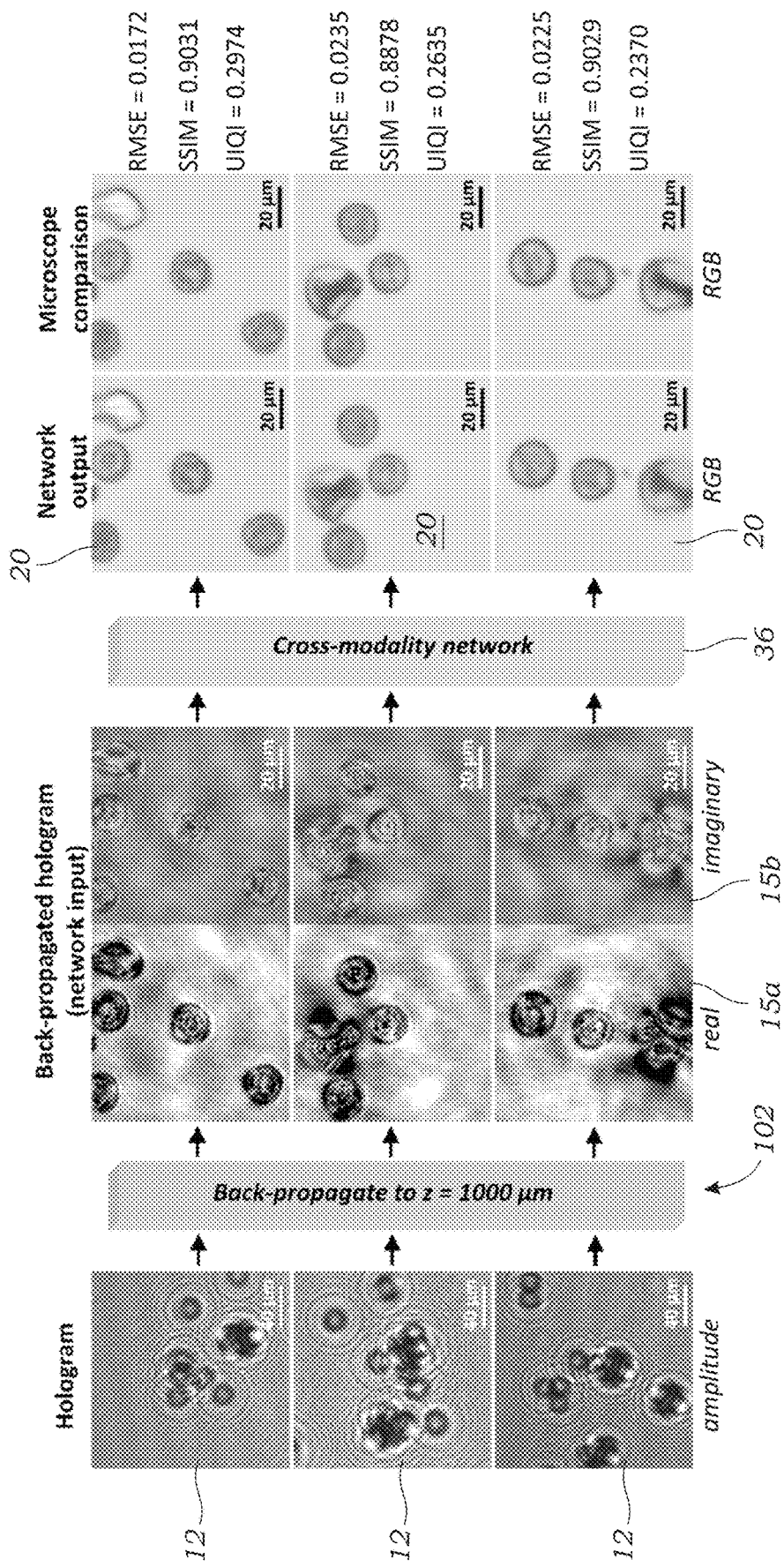
FIG. 5 illustrates a process of imaging of a pollen mixture captured on a substrate. Each input hologram or holographic image is shown with a larger FOV to better illustrate the fringes. Each network output image is quantitatively compared against the corresponding bright-field microscopy ground-truth image using the root mean square error (RMSE), the structural similarity index (SSIM), and the universal image quality index (UIQI) which is illustrated adjacent to the microscope comparison images.

It should be emphasized that these steps need to be performed only once for the training of the GAN network 36, after which the generator network 36 can blindly take a new back-propagated image 15a, 15b (the back-propagated image collectively includes the real and imaginary components) that it has never seen before and infer the corresponding bright-field image (or fluorescence image or dark-field image in other embodiments) at any arbitrary depth (z) within the volume of the sample 14 in nearly real time (e.g., the inference time for a FOV of ~0.15 mm² is ~0.1 s using a single Nvidia 1080 Ti GPU). FIG. 5 presents an example of these blind testing results for several pollen mixtures, where the back-propagated hologram images 15a, 15b are compromised by twin-image and self-interference artifacts as well as speckle and out-of-focus interference. On the other hand, the generator network's 36 output image 20 for each depth (z) clearly shows improved contrast and is free of the artifacts and noise features observed in the back-propagated hologram images 15a, 15b (e.g., speckle and interferometric artifacts, and twin image noise). These results match well with the corresponding bright-field images (the ground-truth images) at the same sample depths. That is to say, the output images 20 substantially resemble images of the sample 14 obtained at the same depth using a bright-field microscope.

In addition, the trained deep neural network 36 correctly colorizes the output images 20 based on the morphological features in the complex-valued input image 15b, using an input holographic image 12 acquired with a monochrome sensor (Sony IMX219PQ, 1.12 μm pixel size) and narrow-band illumination ($\lambda$=850 nm, bandwidth~1 nm), such that the output image 20 matches the color distribution of the bright-field ground-truth image. This is seen in FIG. 5 for the yellow ragweed pollens and oak tree pollens as well as the white Bermuda grass pollens. Furthermore, the root mean square error (RMSE), structural similarity index (SSIM), and universal image quality index (UIQI) were used to quantitatively demonstrate the close resemblance of the network inferences (i.e., output images 20) to the bright-field microscopy ground-truth images, as shown in FIG. 5. In addition, the performance of several variations of the GAN network 36 framework were quantitatively compared, including one without adversarial loss, one with spectral normalization added to the discriminator and one with an encoder-decoder structure; the results of these comparisons revealed that these GAN variations demonstrate similar inference performance.

Figure 6:
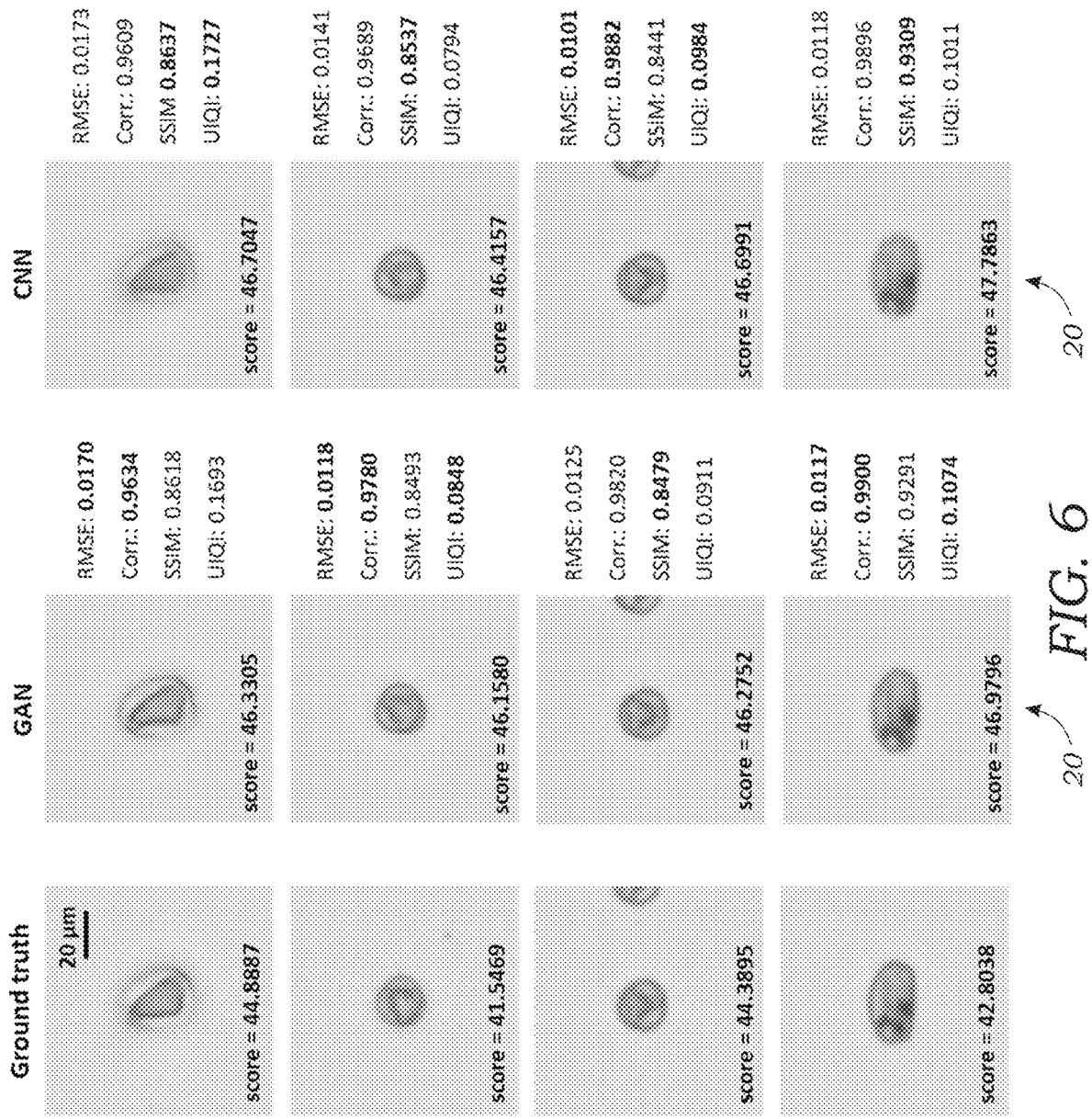
FIG. 6 illustrates images of sample reconstructions performed by GAN and CNN along with the ground-truth images. The images are compared against the corresponding microscope image ground truth acquired at the same depth, using root mean square error (RMSE), Pearson correlation coefficient (Corr.), structural similarity index (SSIM), and universal image quality index (UIQI). The better value for each criterion for each image is highlighted in bold.

FIG. 6 illustrates the results of two different trained deep neural networks 36 including the GAN network 36 disclosed above and a convolution neural network (CNN) 36. The CNN is the same as the generator network trained without using the discriminator and the adversarial loss terms. The two networks 36 were trained on the same dataset for similar number of iterations (~40 epochs). Four in-focus reconstructions of pollen samples 14 are shown. The images are compared against the corresponding microscope image ground-truth acquired at the same depth, using root mean square error (RMSE), Pearson correlation coefficient (Corr.), structural similarity index (SSIM), and universal image quality index (UIQI). The better value for each criterion for each image is highlighted in bold. The quantitative values resulting from this comparison are almost identical for GAN and CNN output images 20. However, the GAN output images 20 are sharper and exhibit more information, which are visually more appealing than the CNN output images 20. Each sample image 20 is also evaluated using a non-reference Blind/Referenceless Image Spatial Quality Evaluator (BRISQUE) score, where the lower score represents better visual quality. The BRISQUE scores are shown on the lower corner of the images, where GAN output images 20 have a smaller/better score compared to CNN output images 20.

Table 1 below illustrates the quantitative comparison of four different network variations. The GAN 36 is the network 36 that was used to report the results herein and is illustrated in FIG. 3. The CNN is the same generator network 36 without using the discriminator and the adversarial loss. The encoder-decoder structure was constructed by removing the concatenation connections in the U-Net (concatenation arrows in FIG. 3). The GAN with spectral normalization is the same structure as GAN 36, with spectral normalization performed on each convolutional layer of the discriminator. All the different trained deep neural networks 36 were trained on the same dataset for similar number of iterations (~40 epochs). The trained neural networks 36 were tested on 175 digitally focused, back-propagated hologram images of pollen. The network output images 20 were quantitatively compared against the corresponding microscope image ground-truth acquired at the same depth, using root mean square error (RMSE), Pearson correlation coefficient (Corr.), structural similarity index (SSIM), and universal image quality index (UIQI). The quantitative values resulting from this comparison are similar regardless of these different network variations that were introduced.

TABLE 1

| | GAN | CNN | Encoder-decoder | GAN with spectral normalization |
|---|---|---|---|---|
| RMSE | 0.0201 | 0.0191 | 0.0218 | 0.0206 |
| Corr. | 0.9643 | 0.9666 | 0.9586 | 0.9626 |
| SSIM | 0.8598 | 0.8567 | 0.8519 | 0.8554 |
| UIQI | 0.1419 | 0.1466 | 0.1345 | 0.1391 |

Figure 7:
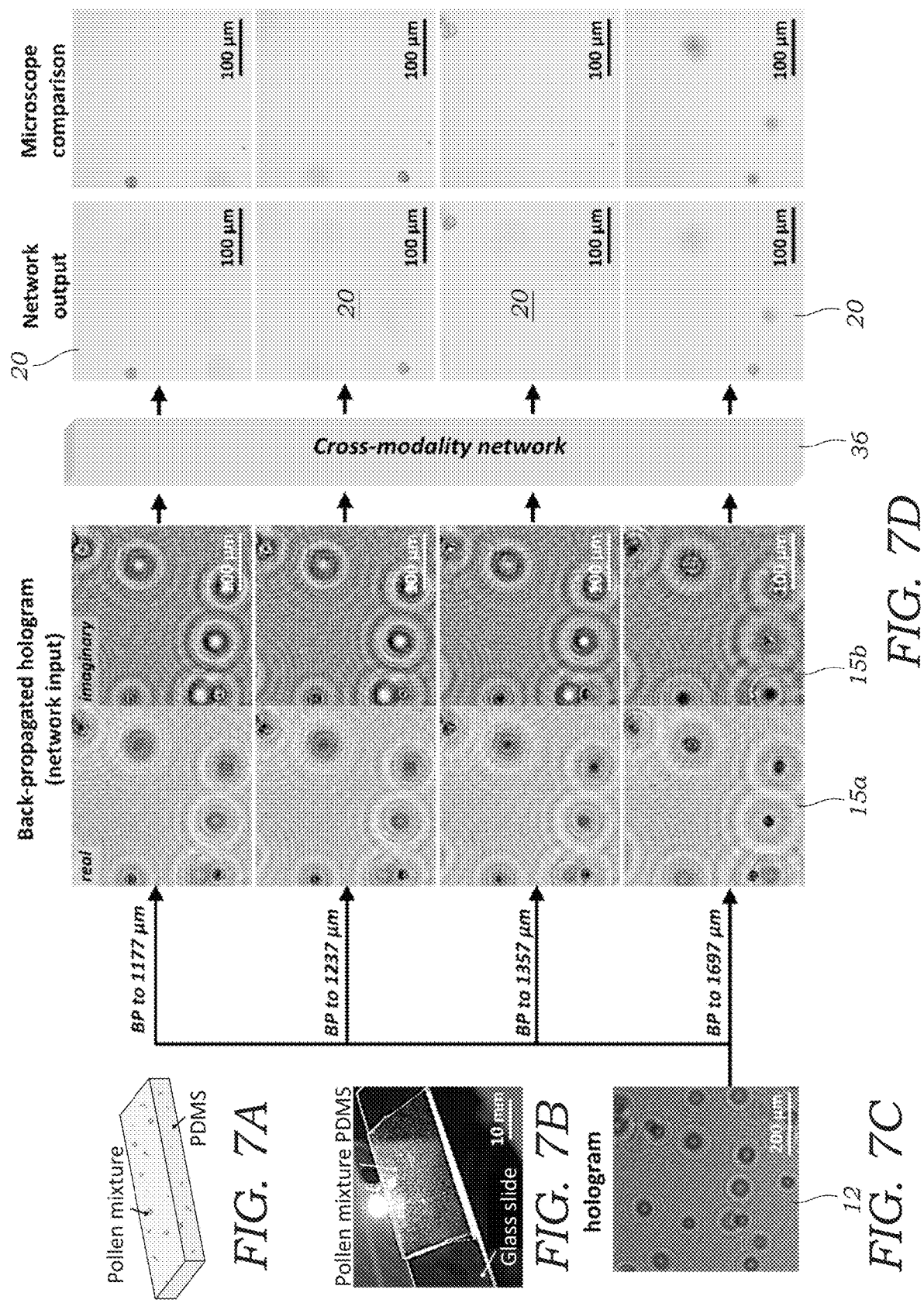
FIG. 7A schematically illustrates a pollen mixture contained in a PDMS 3D substrate (thickness is ~800 μm).
FIG. 7B is a photographic image of the pollen mixture contained in a PDMS 3D substrate.
FIG. 7C illustrates a holographic image of the PDMS substrate taken with a holographic microscope.
FIG. 7D illustrates various back-propagated (BP) holographic images at different distances (z) that are input into the trained deep neural network which generates the network output. Also illustrated alongside the corresponding network output images are corresponding microscope images.

Although deep neural network 36 was trained only with pollen mixtures captured on 2D substrates, it can successfully perform inference for the volumetric imaging of samples at different depths. FIGS. 7A and 7B illustrates a pollen mixture captured in 3D in a bulk volume of polydimethylsiloxane (PDMS) with a thickness of ~800 μm. A single in-line holographic image 12 of the sample 14 (FIG. 7C) was captured and digitally back-propagated to different depths (z) within the sample volume (FIG. 7D). By feeding these back-propagated holographic images 15a, 15b into the trained deep neural network 36, output images 20 were obtained (FIG. 7D (network output images 20)) that are free of speckle artifacts and various other interferometric artifacts observed in holography (e.g., twin images, fringes related to out-of-focus objects, and self-interference). These images match the contrast and depth-of-field (DOF) of bright-field microscopy images that were mechanically focused onto the same plane within the 3D sample.

For much denser or spatially connected 3D samples 14, the trained deep neural network's 36 inference process may generate suboptimal results because the training image data were acquired from uniform and relatively sparse samples (bioaerosols), and in the case of a spatially dense or connected sample 14, the reference wave in the hologram formation might become distorted because of the in-line operation, deviating from a plane wave due to dense scattering and possible intra-sample occlusion. For applications related to, e.g., aerosol imaging or cytometry, this phenomenon does not pose a limitation; for other applications that require the imaging of denser samples in 3D, the inference performance of this approach can be improved by training the network 36 with dense and spatially connected samples 14.

Figure 8:
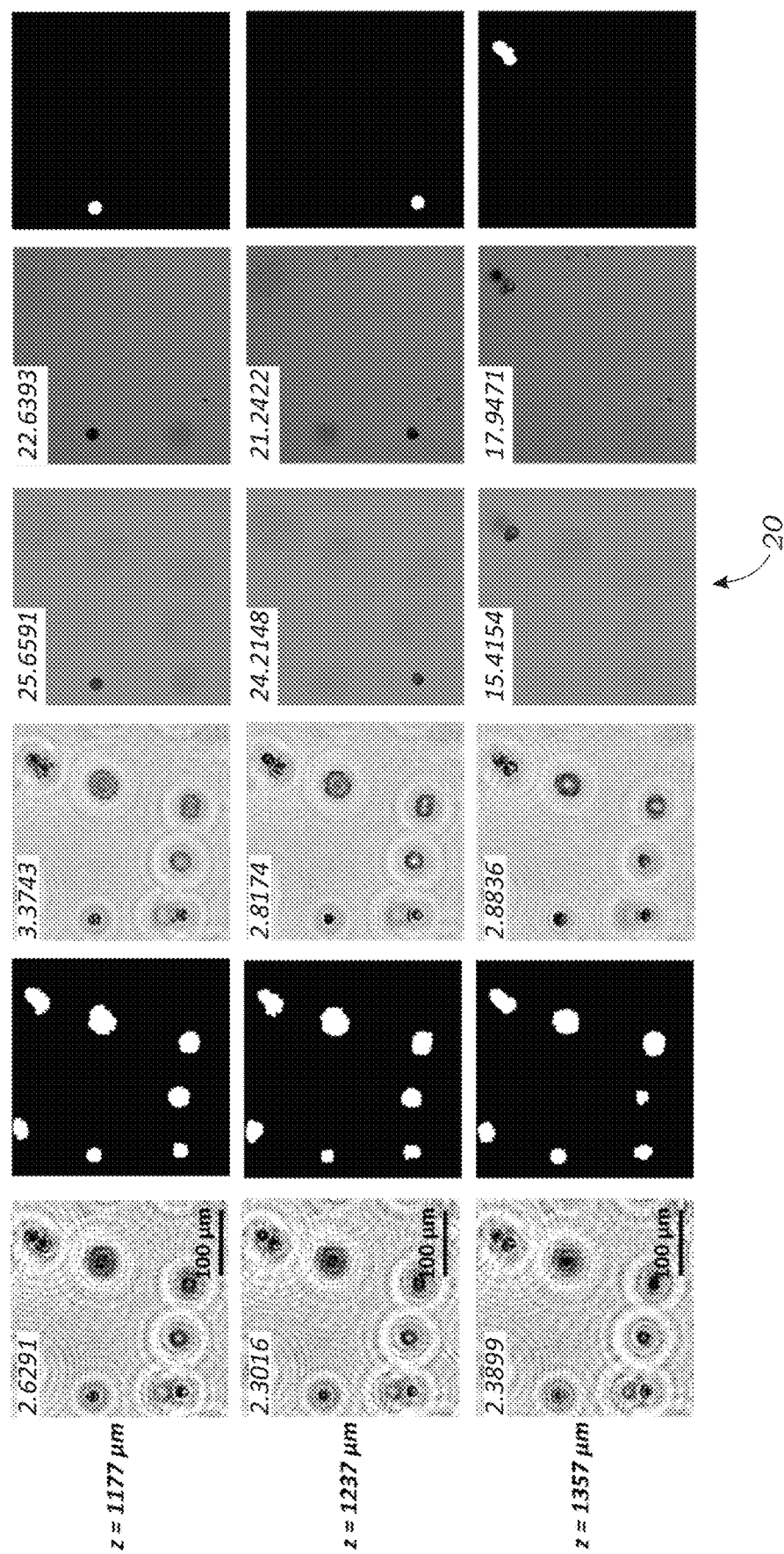
FIG. 8 illustrates a comparison of bright-field holography against an iterative phase recovery method for a volumetric pollen sample. Object support-based phase recovery was used (with 20 iterations). The network output and bright-field microscope ground truth images were converted into gray scale using the Matlab function rgb2gray for comparison purposes. Contrast to noise ratio (CNR), which is defined as the ratio of the contrast (the average of the pixel amplitudes outside the CNR mask minus the average of the pixel amplitudes inside the mask) with respect to noise (the standard deviation of the pixel amplitudes outside the mask), was used to quantitatively compare the results, with the corresponding CNR values marked by a number on the upper-left corner of each image.

It should be noted that the snapshot volumetric reconstruction performance presented herein cannot be obtained through standard coherent denoising or phase recovery methods. To provide an example of this, in FIG. 8, illustrates the comparison results of an object-support-based phase recovery method applied to the same sample holographic image 12 that was back-propagated to different heights. As shown in this figure, the iterative phase recovery method indeed improved the contrast-to-noise ratio (CNR) of the back-propagated holographic images from ~2 to ~3, especially suppressing some of the twin-image-related artifacts. However, the out-of-focus fringes created by the 3D object were not adequately sectioned out and remained as reconstruction artifacts even after iterative phase recovery. In contrast, the trained deep neural network 36 output image 20 transformed the defocused coherent fringes into diminished incoherent blobs, achieving a high CNR of >15-25, very well matching the ground-truth images captured by the high-NA bright-field microscope, as shown in FIG. 8.

Figure 9A:
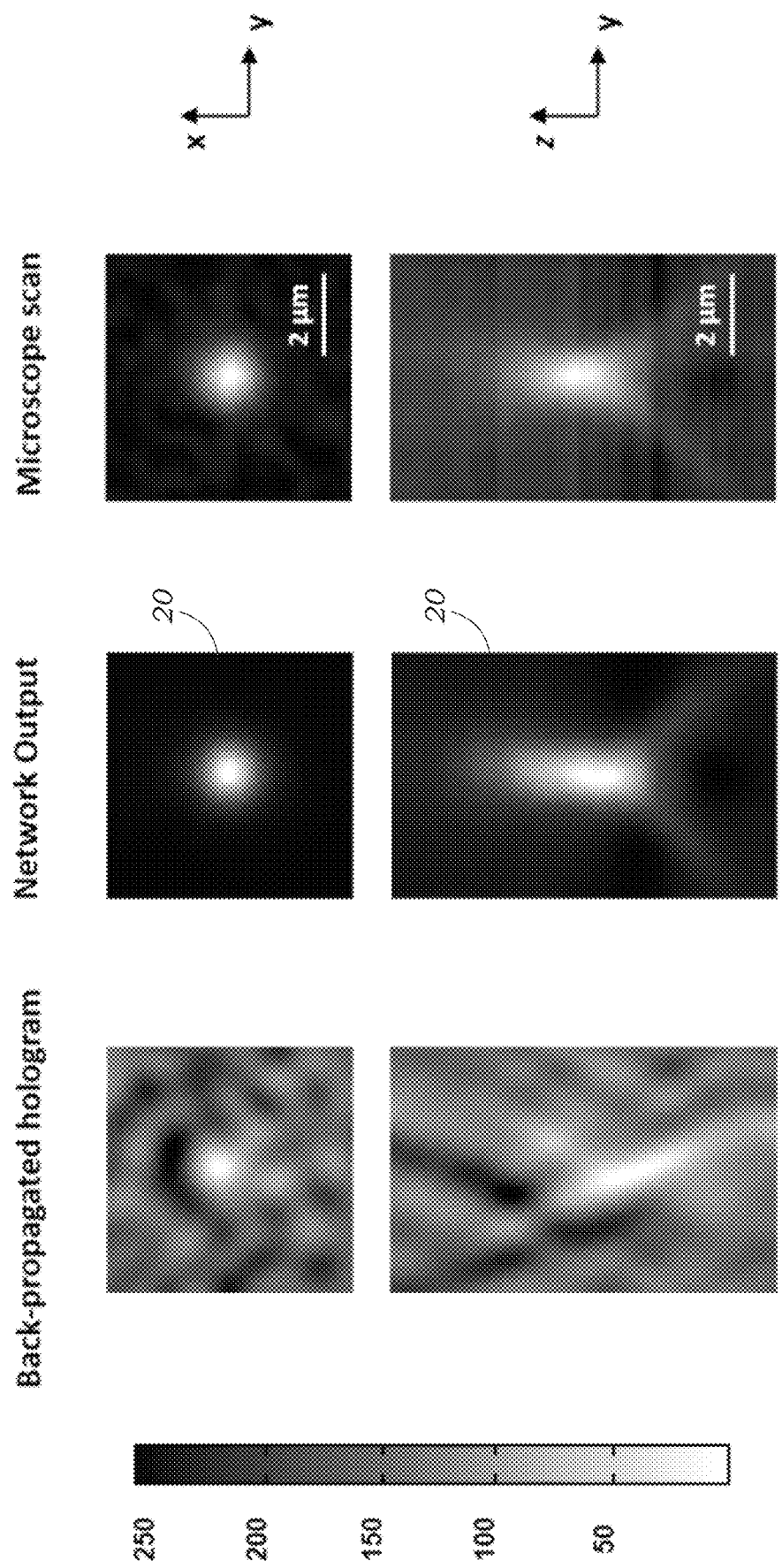
FIG. 9A illustrates 3D imaging of a single microbead and a comparison of the standard holographic back-propagation results against the network output and the images captured by a scanning bright-field microscope via N=81 scans with an axial step size of 0.5 μm.
Figure 9B:
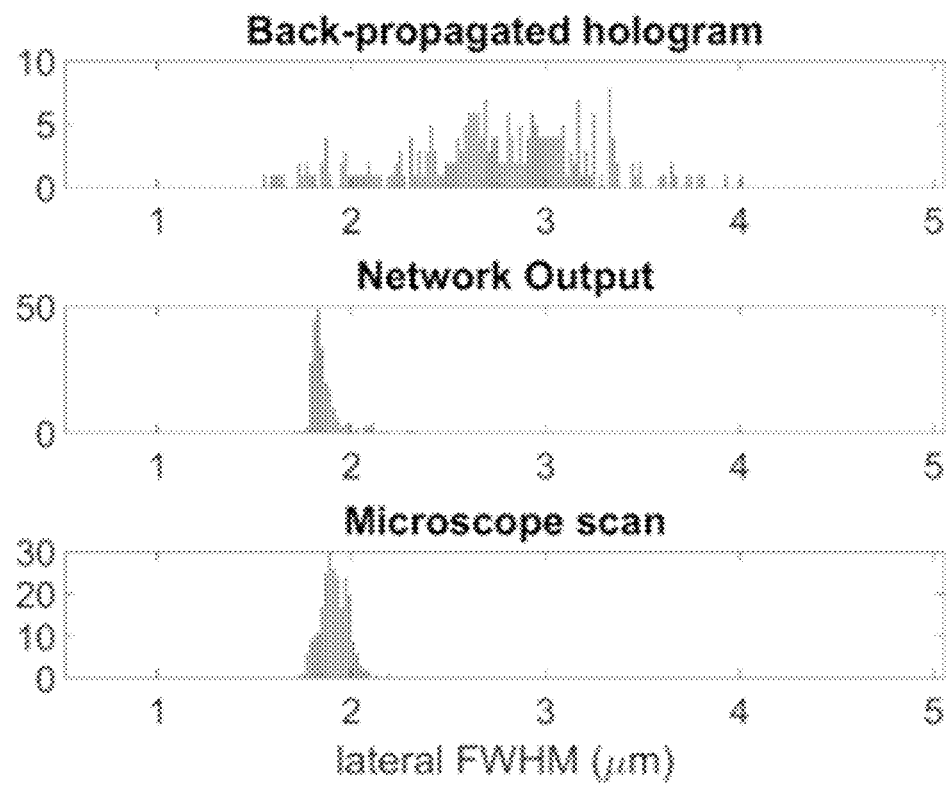
FIG. 9B shows the lateral PSF FWHM histogram comparison corresponding to 245 individual/isolated microbeads.
Figure 9C:
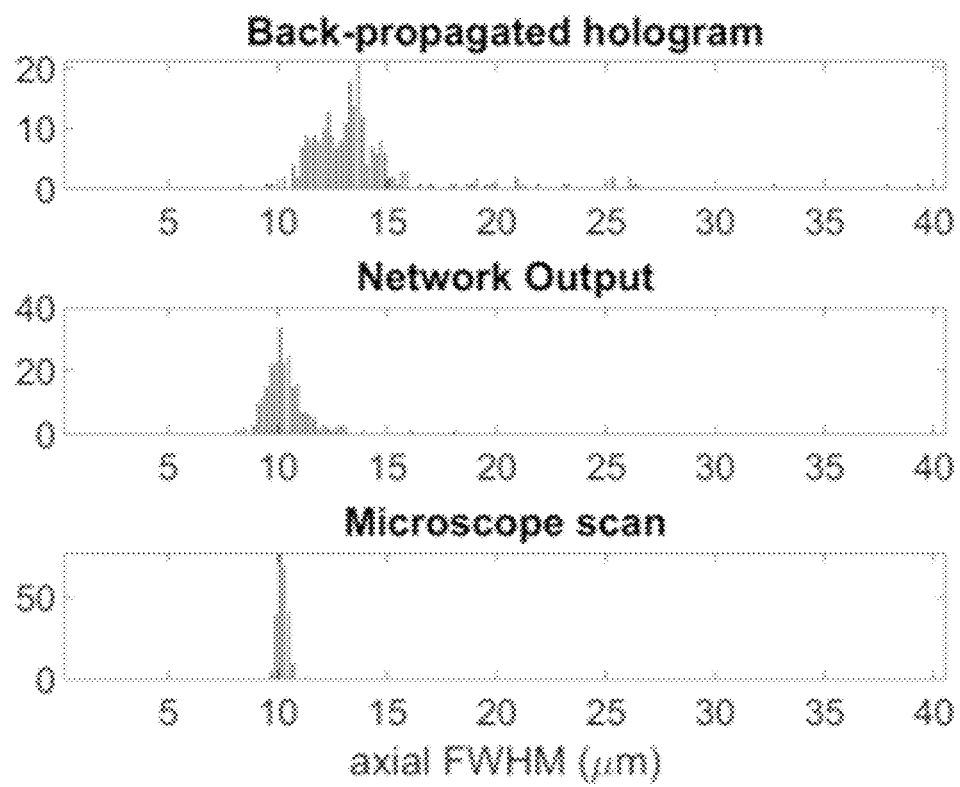
FIG. 9C shows the axial PSF FWHM histogram comparison corresponding to 245 individual/isolated microbeads.

To further quantify this cross-modality transformation performance, samples 14 containing 1 μm polystyrene beads were imaged and another GAN 36 was trained following the same method. Next, a sample containing 245 individual/isolated microbeads was blindly tested and their 3D PSF distributions were measured before and after GAN inference (FIGS. 9A-9C). An example of this comparison is shown in FIG. 9A, where the back-propagated hologram images (back-propagated amplitude images are illustrated) contain significant interference artifacts that were removed by the GAN as evidenced by the output images 20, yielding output images 20 that match the high contrast of the mechanically scanned bright-field microscopy ground-truth images (microscope images of FIG. 9A). FIG. 9B shows the distributions of the lateral and axial full-width-at-half-maximum (FWHM) values corresponding to the 3D PSFs obtained using these 245 microbeads. Due to the interference artifacts and low contrast, the FWHM values of the PSFs of the backpropagated hologram (input) are randomly distributed in the lateral direction, with a median FWHM of 2.7176 μm. In contrast, the lateral FWHM values of the PSFs of the GAN output images 20 are monodisperse, with a median FWHM of 1.8254 μm, matching that of the scanning bright-field microscopy ground-truth (1.8719 μm) (FIG. 9B). Due to the longer coherence length, the PSFs of the backpropagated hologram (input) are longer in the axial direction, with a median FWHM of 12.9218 μm, compared to the scanning bright-field microscopy ground-truth, with a median FWHM of 9.8003 μm. The network inference results show a significantly narrower PSF distribution in the axial direction, with a median FWHM of 9.7978 μm, very well matching that of the ground-truth obtained with the scanning bright-field microscope (FIG. 9C). These results and the quantitative agreement between the network output images 20 and the ground-truth images obtained with a scanning bright-field microscope further support the validity of the system 10.

This deep-learning-enabled, cross-modality image transformation system 10 and method between holography and bright-field imaging (as one example) can eliminate the need to mechanically scan a volumetric sample. It benefits from the digital wave-propagation framework of holography to virtually scan throughout the volume of the sample 14, and each one of these digitally propagated fields is transformed into output images 20 that substantially resemble or are equivalent to bright-field microscopy images that exhibit the spatial and color contrast as well as the shallow DOF expected from incoherent microscopy. In this regard, the deep-learning-enabled hologram transformation network 36 achieves the best of both worlds by fusing the volumetric digital imaging capability of holography with the speckle- and artifact-free image contrast of bright-field microscopy. This capability can be especially useful for the rapid volumetric imaging of samples flowing within a liquid. This approach can also be applied to other holographic microscopy and/or incoherent microscopy modalities to establish a statistical image transformation from one mode of coherent imaging into another incoherent microscopy modality. The system 10 enables the inference of a whole 3D sample volume from a single snapshot holographic image 12 (e.g., hologram), thus reintroducing coherent holographic imaging as a powerful alternative to high-NA bright-field microscopy for the task of high-throughput volumetric imaging, and therefore represents a unique contribution to the field of coherent microscopy.

Methods

Digital Holographic Image Acquisition

The holographic images 12 were acquired using a customized lens-free holographic imaging system (e.g., holographic microscope 16) illustrated schematically in FIG. 1B. The system consisted of a vertical-cavity surface-emitting laser (VCSEL) diode ($\lambda$=850 nm) as the light source 40 for illumination, a complementary metal-oxide-semiconductor (CMOS) image sensor 42 (Sony IMX219PQ, 1.12 μm pixel size) and a Raspberry Pi 2 for system control. This near-infrared illumination was chosen to enable the use of all four Bayer channels of the color image sensor 42 to improve the pixel-size-limited resolution of the hologram that could be achieved in a single snapshot. The sample 14 was mounted on a 3D printed sample holder 18 placed ~500 μm above the image sensor 42 surface. The illumination source 40 was placed ~8 cm above the sample plane without any additional spatial or spectral filter.

Scanning Bright-Field Microscopy Image Acquisition and Alignment

The bright-field microscopy images (i.e., ground-truth images) were captured by an inverted scanning microscope (IX83, Olympus Life Science) using a 20×/0.75 NA objective lens (UPLSAPO20X, Olympus Life Science). The microscope scanned each sample at different lateral locations, and at each location, an image stack of −30 µm to 30 µm with a 0.5 µm step size was captured. After the capture of these bright-field images, the microscopy image stack was aligned using the ImageJ plugin StackReg, which corrected the rigid shift and rotation caused by the inaccuracy of the microscope scanning stage.

Hologram Backpropagation and Autofocusing

The raw digital in-line hologram (holographic image 12) was balanced and shade corrected by estimating the low-frequency shade of each Bayer channel using a wavelet transform. This corrected hologram was digitally back-propagated to different planes (which matched the corresponding planes in the bright-field microscopy image stack) using angular-spectrum-based free-space backpropagation. For this purpose, 3× padding was used in the angular spectrum (Fourier) domain, which effectively interpolated the hologram pixel size by 3×. To match the heights of the backpropagated holograms and the corresponding bright-field microscopy image stacks, the focal planes were estimated and cross-registered as "zero" height, and the relative axial propagation distance was determined to match the axial scanning step size of the bright-field microscope (0.5 µm). The digital hologram's focal plane was estimated using an edge sparsity-based holographic autofocusing criterion.

Network and Training

The GAN 36 implemented here for training consisted of a generator network (G) and a discriminator network (D), as shown in FIG. 3. The generator network (G) employed a variation of the original U-Net design with minor modifications and additional residual connections. The discriminator network (D) was a convolutional neural network with six convolutional blocks and two fully connected (linear) layers. Note, however, that after training the GAN 36, the discriminator network (D) is not used in the final trained deep neural network 36 because it was used to train the parameters of the final trained deep neural network 36. The original training data consisted of 6,000 image pairs (see Table 2 below), which were augmented to 30,000 image pairs by random rotation and flipping of the images.

TABLE 2

| Dataset | Training images | Validation images | Testing images | Data distribution |
|---|---|---|---|---|
| 2D pollen dataset | 5,966 | 1,000 | 175 | Range [−30, 30] µm, step 0.5 µm In-focus:defocus = 1:5 |
| 3D pollen dataset | 0 | 0 | 1 | Range [−500, 500] µm, step 10 µm |
| 1 µm bead dataset | 13,603 | 2,400 | 245 | Range [−20, 20] µm, step 0.5 µm In-focus:defocus = 1:21 |

The 2D pollen dataset is composed of images from pollen samples captured on a flat substrate using a sticky coverslip. The 3D pollen dataset is composed of images of pollen mixture spread in 3D inside a polydimethylsiloxane (PDMS) substrate with ~800 µm thickness. The 3D pollen dataset only has testing images and is evaluated using the network trained with 2D pollen images. Both datasets include in-focus and de-focused pairs of images for training to capture the 3D light propagation behavior across the holographic and bright-field microscopy modalities. The image size of 3D pollen PDMS testing dataset is 1024×1024 pixels, the other images are of size 256×256 pixels.

The validation data were not augmented. In each training iteration, the generator network was updated six times using the adaptive moment estimation (Adam) optimizer with a learning rate of $10^{-4}$, whereas the discriminator network was updated three times with a learning rate of $3\times10^{-5}$. The validation set was tested every 50 iterations, and the best network was chosen to be the one with the lowest mean absolute error (MAE) loss on the validation set. The network 36 was built using an open-source deep-learning package, TensorFlow. The training and inference were performed on a PC with a six-core 3.6 GHz CPU and 16 GB of RAM using an Nvidia GeForce GTX 1080 Ti GPU. On average, the training process took ~90 hours for ~50,000 iterations (equivalent to ~40 epochs). After training, the network inference time was ~0.1 s for an image patch of 256×256 pixels.

Sample Preparation

Dried pollen samples: Bermuda grass pollen (*Cynodon dactylon*), oak tree pollen (*Quercus agrifolia*), and ragweed pollen (*Artemisia artemisifolia*) were purchased from Stallergenes Greer (NC, USA) (cat #: 2, 195, and 56 respectively) and mixed with a weight ratio of 2:3:1. The mixture was deposited onto a sticky coverslip from an impaction based air sampler for the 2D pollen sample. The mixture was also diluted into PDMS and cured on a glass slide for the 3D pollen sample. Polystyrene bead sample with 1 µm diameter was purchased from Thermo Scientific (cat #: 5100A) and diluted 1000× by methanol. A droplet of 2.5 µL of diluted bead sample was pipetted onto a cleaned #1 coverslip and let dry.

Training Data Preparation

The success of the cross-modality transform behind bright-field holography relies on accurate registration of the back-propagated holograms with the scanning bright-field microscope images in 3D. This registration can be divided into two parts, also shown in FIG. 4. The first part matches a bright-field image (2048×2048 pixels) to that of the hologram, with the following steps: (1) A stitched bright-field full-FOV image of ~20,000×4,000 pixels was generated by stitching together the middle planes of each bright-field microscope stack using ImageJ plugin Microscopy Image Stitching Tool (MIST) as seen in operation 122. (2) The shade-corrected full-FOV hologram was back-propagated to a global focus distance determined by auto-focusing on a region of 512×512 pixels in the center of the hologram as seen in operation 112. (3) The bright-field full-FOV image was roughly registered to the back-propagated hologram full-FOV by fitting a rigid transformation through 3-5 pairs of manually selected matching points as seen in operation 124. (4) The bright-field full-FOV was then warped using this transformation (operation 128), and the overlapping regions with hologram was cropped to generate matching pairs (operations 114, 130).

The second part further refines the registration in x-y and z directions, with the following steps: (1) small FOV pairs (300×300 pixels) were selected from the cropped FOV as seen in operations 116, 132. (2) Autofocusing was performed on each hologram patch (operation 118) to find the focus distance for this patch, denoted as $z_0^{Holo}$. (3) The standard deviation (std) of each bright-field height within the stack was calculated, which provides a focus curve for the bright-field stack. A second-order polynomial fit was performed on four heights in the focus curve with highest std values, and the focus for this bright-field stack was determined to be the peak location of the fit, denoted as $z_0^{BF}$. (4) For each microscope scan in the stack at height $z_i^{BF}$, a corresponding hologram image was generated by back-propagating the hologram by the distance $z_i^{BF} - z_0^{BF} + z_0^{Holo}$, where symmetric padding was used on the hologram during the propagation to avoid ringing artifacts. (5) The best focused plane in each stack, as well as five other randomly selected defocused planes were chosen (operation 120). (6) Pyramid elastic registration (operation 142) was performed on the small FOV image pair closest to the focal plane, and the same registered warping was applied to the other five defocused image pairs to generate 6 aligned small FOV pairs in total. (7) The corresponding patches were cropped to 256×256 pixels in image size (operation 144). Since the pyramidal registration can sometimes fail to converge to the correct transformation, the generated dataset was also manually inspected to remove the data that had significant artifacts due to registration errors.

Details of Network and Training

The GAN 36 implemented here consisted of a generator network (G) and a discriminator network (D), as shown in FIG. 3. The generator (G) employed an alternation of the original U-Net design with minor modifications and additional residual connections. The discriminator network (D) was a convolutional neural network with six convolutional blocks and two fully-connected (linear) layers. The input of the generator had dimensions of 256×256×2 where the two channels were the imaginary 15b and real 15a parts of the back-propagated complex-valued hologram. The output of generator (G) and the input of discriminator (D) had dimensions of 256×256×3, with the three channels corresponding to the red, green and blue (RGB) channels of the bright-field image. Following the image registration and cropping, the dataset was divided into 75% for training, 15% for validation, and 10% for blind testing. The training data consisted of ~6,000 image pairs, which were further augmented to 30,000 by random rotation and flipping of the images. The validation data were not augmented.

During the training phase, the network iteratively minimized the generator loss $L_G$ and discriminator loss $L_D$, defined as:

$$L_G = \frac{1}{2N} \cdot \sum_{i=1}^{N} [D(G(x^{(i)})) - 1]^2 + \alpha \cdot \frac{1}{N} \cdot \sum_{i}^{N} MAE(x^{(i)}, z^{(i)}) \quad (1)$$

$$L_D = \frac{1}{2N} \cdot \sum_{i=1}^{N} [D(G(x^{(i)}))]^2 + \frac{1}{2N} \cdot \sum_{i=1}^{N} [D(z^{(i)}) - 1]^2 \quad (2)$$

where $G(x^{(i)})$ is the generator output for the input $x^{(i)}$, $z^{(i)}$ is the corresponding target (bright-field) image, $D(.)$ is the discriminator, and $MAE(.)$ stands for the mean absolute error, defined as:

$$MAE(x, z) = \frac{1}{L^2} \sum_{m=1}^{L} \sum_{n=1}^{L} |x_{mn} - z_{mn}| \quad (3)$$

where the images have L×L pixels. N stands for the image batch size (e.g., N=20), α is a balancing parameter for the GAN loss and the MAE loss in the $L_G$ which was chosen as α=0.01 and as result, the GAN loss and MAE loss terms occupied 99% and 1% of the total loss, $L_G$, respectively. Adaptive momentum (Adam) optimizer was used to minimize $L_G$ and $L_D$, with learning rate $10^{-4}$ and $3 \times 10^{-5}$ respectively. In each iteration, six updates of the generator and three updates of the discriminator network were performed. The validation set was tested every 50 iterations, and the best network was chosen to be the one with the lowest MAE loss on the validation set. The network 36 was implemented using TensorFlow although it should be appreciated that other software programs may be used.

Estimation of the Lateral and Axial FWHM Values for PSF Analysis

A threshold was used on the most focused hologram plane to extract individual sub-regions, each of which contained a single bead. A 2D Gaussian fit was performed on each sub-region to estimate the lateral PSF FWHM. The fitted centroid was used to crop x-z slices, and another 2D Gaussian fit was performed on each slice to estimate the axial PSF FWHM values for (i) the back-propagated hologram stacks, (ii) the network output stacks and (iii) the scanning bright-field microscope stacks. Histograms for the lateral and axial PSF FWHM were generated subsequently, as shown in FIGS. 9B and 9C.

Quantitative Evaluation of Image Quality

Each network output image $I^{out}$ was evaluated with reference to the corresponding ground truth (bright-field microscopy) image $I^{GT}$ using four different criteria: (1) root mean square error (RMSE), (2) correlation coefficient (Corr), (3) structural similarity (SSIM), and (4) universal image quality index (UIQI). RMSE is defined as:

$$RMSE(I^{out}, I^{GT}) = \frac{1}{\sqrt{L_x \cdot L_y}} \sqrt{\|I^{out} - I^{GT}\|_2^2} \quad (4)$$

where $L_x$ and $L_y$ represent the number of pixels in the x and y directions, respectively.

Correlation coefficient is defined as:

$$Corr(I^{out}, I^{GT}) = \frac{\sigma_{out,GT}}{\sigma_{out}\sigma_{GT}} \quad (5)$$

where $\sigma_{out}$ and $\sigma_{GT}$ are the standard deviations of $I^{out}$ and $I^{GT}$ respectively, and $\sigma_{out,GT}$ is the cross-variance between the two images.

SSIM is defined as:

$$SSIM(I^{out}, I^{GT}) = \frac{(2\mu_{out}\mu_{GT} + C_1)(2\sigma_{out,GT} + C_2)}{(\mu_{out}^2 + \mu_{GT}^2 + C_1)(\sigma_{out}^2 + \sigma_{GT}^2 + C_2)} \quad (6)$$

where $\mu_{out}$ and $\mu_{GT}$ are the mean values of the images $I^{out}$ and $I^{GT}$, respectively. $C_1$ and $C_2$ are constants used to prevent division by a denominator close to zero.

UIQI is the product of three components: correlation coefficient (Corr, see Eq. (5)), luminance distortion (l) and contrast distortion (c), i.e.:

$$UIQI(I^{out}, I^{GT}) = Corr(I^{out}, I^{GT}) \cdot l(I^{out}, I^{GT}) \cdot c(I^{out}, I^{GT}) \quad (7)$$

where $$l(I^{out}, I^{GT}) = \frac{2\mu_{out}\mu_{GT}}{\mu_{out}^2 + \mu_{GT}^2} \quad (8)$$

$$c(I^{out}, I^{GT}) = \frac{2\sigma_{out}\sigma_{GT}}{\sigma_{out}^2 + \sigma_{GT}^2} \quad (9)$$

UIQI was measured locally across M windows of size B×B, generating local UIQIs: $Q_i$ (i=1, 2, ..., M). Then the global UIQI was defined as the average of these local UIQIs:

$$Q = \frac{1}{M}\sum_{i=1}^{M} Q_i \quad (10)$$

A window of size B=8 was used.

In addition to the above discussed measures, the image quality was also evaluated using the Blind Reference-less Image Spatial Quality Evaluator (BRISQUE), using a Matlab built-in function "brisque".

While embodiments of the present invention have been shown and described, various modifications may be made without departing from the scope of the present invention. It should be appreciated that while an in-line, lens-less holographic microscope was used the methods are applicable to other holographic and interferometric microscopes and imagers. The invention, therefore, should not be limited except to the following claims and their equivalents.

What is claimed is:

1. A method of transforming an image of a sample obtained with a holographic microscope to an image that substantially resembles a microscopy image obtained with a microscope having a different microscopy image modality comprising:
    obtaining a single holographic image of the sample with the holographic microscope;
    back-propagating the holographic image of the sample to a particular depth using image processing software executed on a computing device using one or more processors;
    inputting the back-propagated holographic image of the sample at the particular depth to a trained deep neural network that is executed by a computing device; and
    outputting an image of the sample at the particular depth from the trained deep neural network, wherein the output image substantially resembles a microscopy image of the sample obtained at the same particular depth with a microscope having the different microscopy image modality; and
    wherein the deep neural network is trained using a plurality of training images obtained with the holographic microscope as well as their corresponding ground-truth images obtained with the microscope having the different image modality.

2. The method of claim 1, wherein the holographic image comprises a monochrome image and the output image comprises a color image.

3. The method of claim 1, wherein the sample comprises a three-dimensional sample and the output image comprises a 3D image stack.

4. The method of claim 1, wherein the holographic microscope comprises a coherent or partially coherent light source.

5. The method of claim 1, wherein the output image is substantially free of speckle and interferometric artifacts, and/or twin image noise.

6. The method of claim 1, wherein the different image modality comprises images captured with one of a bright-field microscope, a fluorescence microscope, or a dark-field microscope.

7. The method of claim 1, wherein the respective training and ground-truth images are registered to one another by matching a field-of-view from respective images followed by a pyramid elastic registration operation.

8. The method of claim 1, wherein the output image has a lateral and/or axial resolution that exceeds the lateral and/or axial resolution of the input images and/or the ground-truth images obtained with the microscope having the different image modality.

9. The method of claim 1, wherein the computing device comprises one or more graphics processing units (GPUs).

10. The method of claim 1, comprising outputting from the trained deep neural network a plurality of images of the sample at different depths, wherein the plurality of output images substantially resemble corresponding microscopy images of the sample obtained at the same respective depths with a microscope having the different microscopy image modality.

11. The method of claim 1, wherein the holographic microscope comprises a lens-free microscope.

12. The method of claim 1, wherein the holographic microscope comprises a portable microscope.

13. A method of transforming an image of a sample obtained with a holographic microscope to an image that substantially resembles a microscopy image obtained with a microscope having a different microscopy image modality comprising:
    obtaining a single holographic image of the sample with the holographic microscope;
    inputting the holographic image of the sample to a trained deep neural network that is executed by a computing device;
    outputting an image of the sample at a particular depth from the trained deep neural network, wherein the output image substantially resembles a microscopy image of the sample obtained at the same particular depth with a microscope having the different microscopy image modality; and
    wherein the deep neural network is trained using a plurality of training images obtained with the holographic microscope as well as their corresponding ground-truth images obtained with the microscope having the different image modality.

14. The method of claim 13, wherein the holographic image comprises a monochrome image and the output image comprises a color image.

15. The method of claim 13, wherein the sample comprises a three-dimensional sample and the output image comprises a 3D image stack.

16. The method of claim 13, wherein the holographic microscope comprises a coherent or partially coherent light source.

17. The method of claim 13, wherein the output image is substantially free of speckle and interferometric artifacts, and/or twin image noise.

18. The method of claim 13, wherein the wherein the output image has a lateral and/or axial resolution that exceeds the lateral and/or axial resolution of the input images and/or ground-truth images obtained with the microscope having the different image modality.

19. The method of claim 13, wherein the different image modality comprises images captured with one of a bright-field microscope, a fluorescence microscope, or a dark-field microscope.

20. The method of claim 13, wherein the respective training and ground-truth images are registered to one another by matching a field-of-view from respective images followed by a pyramid elastic registration operation.

21. The method of claim 13, wherein the computing device comprises one or more graphics processing units (GPUs).

22. The method of claim 13, comprising outputting from the trained deep neural network a plurality of images of the sample at different depths, wherein the plurality of output images substantially resemble corresponding microscopy images of the sample obtained at the same respective depths with a microscope having the different microscopy image modality.

23. The method of claim 13, wherein the holographic microscope comprises a lens-free microscope.

24. The method of claim 13, wherein the holographic microscope comprises a portable microscope.

25. A microscopy system comprising:
a holographic microscope; and
one or more computing devices having software executable thereon and configured a execute image processing software including a trained deep neural network, the trained deep neural network receiving as an input a raw and/or back-propagated hologram image of a sample obtained with the holographic microscope and outputting one or more output images of the sample at any arbitrary depth within the sample, wherein the one or more output images substantially resemble a microscopy image of the sample obtained at the same arbitrary depth within the sample acquired with a microscope having a different microscopy image modality; and
wherein the deep neural network is trained using a plurality of training images obtained with the holographic microscope as well as their corresponding ground-truth images obtained with the microscope having the different image modality.

26. The microscopy system of claim 25, wherein the different image modality comprises images captured with one of a bright-field microscope, a fluorescence microscope, or a dark-field microscope.

27. The microscopy system of claim 25, wherein the holographic microscope is a lens-free microscope.

28. The microscopy system of claim 25, wherein the holographic microscope comprises a portable microscope.

29. The microscopy system of claim 25, wherein the sample comprises a three-dimensional sample and the output image comprises a 3D image stack.

30. The microscopy system of claim 25, wherein the one or more computing devices comprises one or more of a personal computer, laptop, tablet PC, portable electronic device, server, or virtual server.

* * * * *